United States Patent [19]
Campman

[11] 3,863,239
[45] Jan. 28, 1975

[54] APPARATUS FOR DETECTING MOTION IN A GIVEN FIELD OF VIEW, FOR SOUNDING AN ALARM WHEN SAID MOTION EXCEEDS A PREDETERMINED EXTENT

[76] Inventor: James P. Campman, 12900 Broadmoor Rd., Silver Spring, Md. 20900

[22] Filed: Feb. 27, 1974

[21] Appl. No.: 446,411

[52] U.S. Cl.............. 340/258 R, 250/578, 307/117
[51] Int. Cl. .......................................... G08b 13/18
[58] Field of Search ........ 340/258 R, 258 D, 258 B; 307/117; 250/578

[56] References Cited
UNITED STATES PATENTS

| | | | |
|---|---|---|---|
| 3,444,544 | 5/1969 | Pearson et al.................... | 340/258 B |
| 3,703,718 | 11/1972 | Berman........................... | 340/258 D |
| 3,760,399 | 9/1973 | Schwarz........................... | 340/258 D |
| 3,781,842 | 12/1973 | Campman........................ | 340/258 B |
| 3,803,572 | 4/1974 | Campman........................ | 340/258 B |

*Primary Examiner*—Glen R. Swann III
*Attorney, Agent, or Firm*—Jack H. Linscott

[57] ABSTRACT

An apparatus for detecting motion of an object or person movable in a field of view has a cylindrical reflecting type lens, oriented with its concentric axis in a vertical direction or at right angles to the direction of motion of the object in the field of view. It includes a photosensitive cell oriented in a direction transverse to the principal axis of the lens and positioned at a point on the principal axis less than the focal length of the lens from the lens surface. The lens produces images in the shape of bands for stationary objects in the field of view, the narrow bands extending parallel to the concentric axis of the cylindrical surface. When an object or person enters the field of view at least two images, movable in character, and in the form of narrow bands are produced on the photosensitive cell and these two movable images traverse the surface of the photosensitive cell in opposite directions with respect to each other, coinciding at a point where the principal axis of the lens intersects the photosensitive cell. When the movable bands traverse the stationary bands on the photosensitive cell, they produce a modulation of the light impinging on the photosensitive cell, which is converted to voltage pulses by the photosensitive cell. The apparatus further includes a frequency discriminator and amplitude discriminator for segregating the pulses produced by the photosensitive cell on the basis of frequency and amplitude, a normalizer for converting the pulses of varying energy content to pulses of uniform energy content, a voltage accumulator for building up a voltage in response to the reception of a given number of pulses in a given interval of time and a switch controlled alarm responsive to a predetermined voltage level for sounding an alarm or for giving an indication that the field of view has been penetrated by a movable object.

5 Claims, 10 Drawing Figures

PATENTED JAN 28 1975

APPARATUS FOR DETECTING MOTION IN A GIVEN FIELD OF VIEW, FOR SOUNDING AN ALARM WHEN SAID MOTION EXCEEDS A PREDETERMINED EXTENT

BACKGROUND OF INVENTION

Prior apparatus of the character of the present invention utilize lens means to produce an image of a field of view and a means for producing a beam of light in the field of view which is focussed upon a photosensitive means. An object or person traversing the field of view and interrupting the light beam causes the photosensitve means to produce an output pulse for each time the beam is interrupted. The pulse is amplified and used to initiate some operation as for example the sounding of an alarm.

Other apparatus is of the passive type, that is, they utilize the ambient light illuminating the field of view. One such type uses a refractory type lens means for producing an image thereof distributed between a plurality of photo cells forming a retina. When an object or person enters the field of view and traverses it, a movable image is created that moves from cell to cell in the retina. The cells are connected in a manner that the retina produces a series of pulses as the image moves form cell to cell in the retina. Such apparatus is disclosed in the Applicant's prior U.S. Pat. No. 3,781,842 and in the applicants co-pending applications Ser. No. 323,751 and Ser. No. 341,706.

Still other apparatus utilize ambient light and multiple lenses of the reflective type, said lenses being physically separated from each other and directed toward different parts of the field of view. All lenses are focused upon a single cell common to each of the lenses. As the intruder traverses the field of view the multiple lens pick up his image in succession and the image of the intruder is caused to make repeated scans of the photo cell producing a multiplicity of pulses. This kind of apparatus is exemplified in the patent to Herbert L. Berman, U.S. Pat. No. 3,703,718 issued Nov. 21, 1972.

The applicant, in his endeavor to improve the signal strength and reliability of intrusion detecting apparatus, in particular in the portion of the apparatus incorporating the lens — photocell combination substituted a cylindrical reflective type means for a refractory type lens and oriented the lens with its vertical concentric axis in a direction at right angles to the expected direction of motion of an intruder. The results obtained were so greatly improved that it could not be attributed to the mere substitution of one type of lens for another to eliminate the chromatic aberrations inherent in refractory type lenses. An examination into the causes of the improved signal strength has resulted in the present invention, which makes use of a concave cylindrical reflective type lens to produce a signal of a multiplicity of pulses in response to motion taking place in the field of view.

It was discovered that a cylindrical concave reflective type lens produces multiple images of the object. These images are visible to the eye when observed at a relatively close distance to the lens means. It was also observed that the images were elongated in a direction parallel to the concentric axis of the lens means. Still further, it was discovered that there were multiple images some of which move in one direction in an assumed image plane and some of which move in the opposite direction in the plane in response to movement of the object that creates the movable images.

These discoveries have made it possible to simplify the apparatus considerably over the disclosed by the prior art and at the same time obtain an output signal of improved strength and of greater number of pulses. The simplification of the apparatus makes it possible to produce the apparatus at less cost to the potential user without any sacrifice of sensitivity or reliability.

OBJECTS OF THE INVENTION

It is an object of the invention to provide an apparatus, which will function with greater efficiency and which will produce better results, namely, a stronger signal, greater sensitivity and greater reliability than heretofore obtainable in prior art devices and apparatus of the same character.

It is another object of the invention to simplify the structure of the apparatus while retaining the benefits of a stronger signal, greater sensitivity and greater reliability to reduce the cost of manufacture of the apparatus and cost to the potential user thereof.

It is still another object of the invention to provide an apparatus of the character mentioned, wherein the range of the apparatus is critical and can be adjusted to suit the requirements of many and varied environments in which it will find utilization.

Other objects of the invention will become obvious as the disclosure of the invention proceeds.

DESCRIPTIONS OF THE DRAWINGS

FIGS. 1 to 3 inclusive are graphic illustation of the functions of the reflective type lens, which are presented to demonstrate the mode of operation of the lens means in the apparatus.

DESCRIPTION OF THE INVENTION

As indicated, the present invention is an apparatus to be used for detecting intrusion upon a field of view, which may be a room, an area in a hall or an enclosed or unenclosed yard. The apparatus, however, is not limited in utility to that chosen as an example of its usefulness. It may be used for ringng door bells, for turning on lights automatically and in machine control applications.

The apparatus is similar in certain respects to what has been previously produced. To appreciate the difference it is essential to understand what functions are performed by the particular type lens system that has been chosen for the present apparatus.

Figure 1:
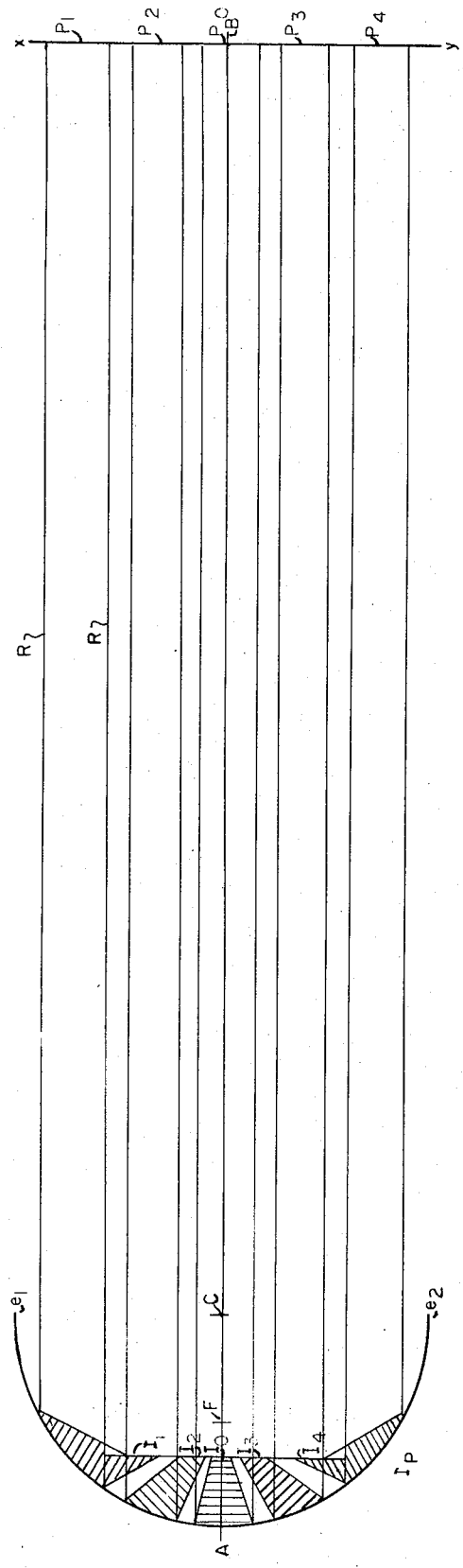
Figure 2:
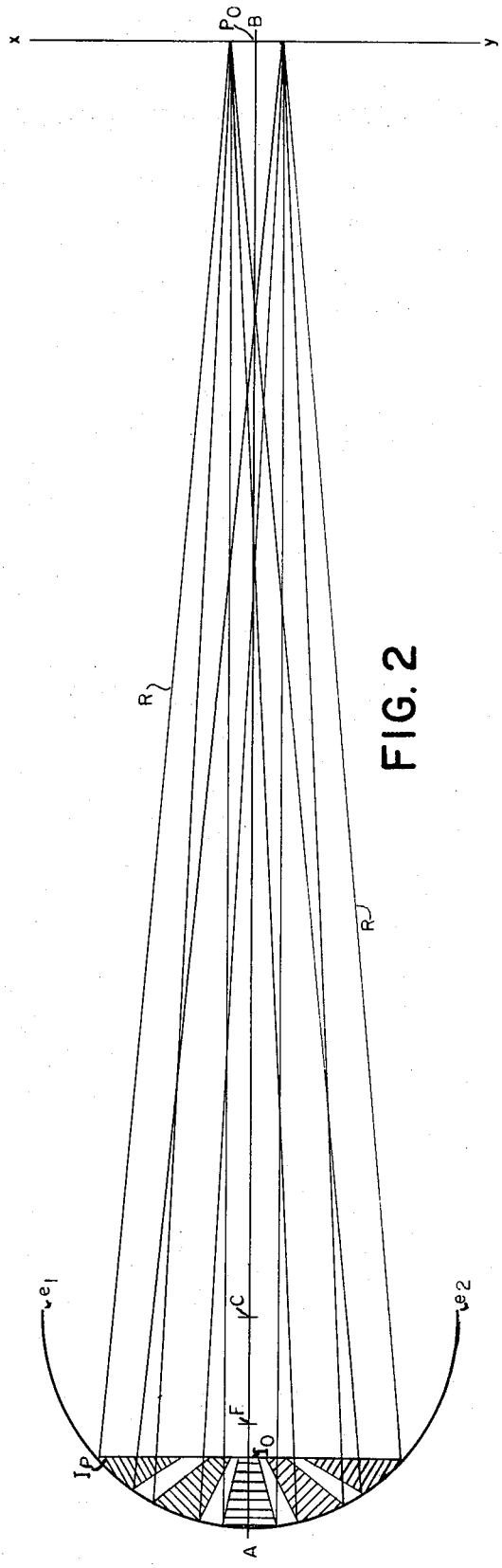
Figure 3:
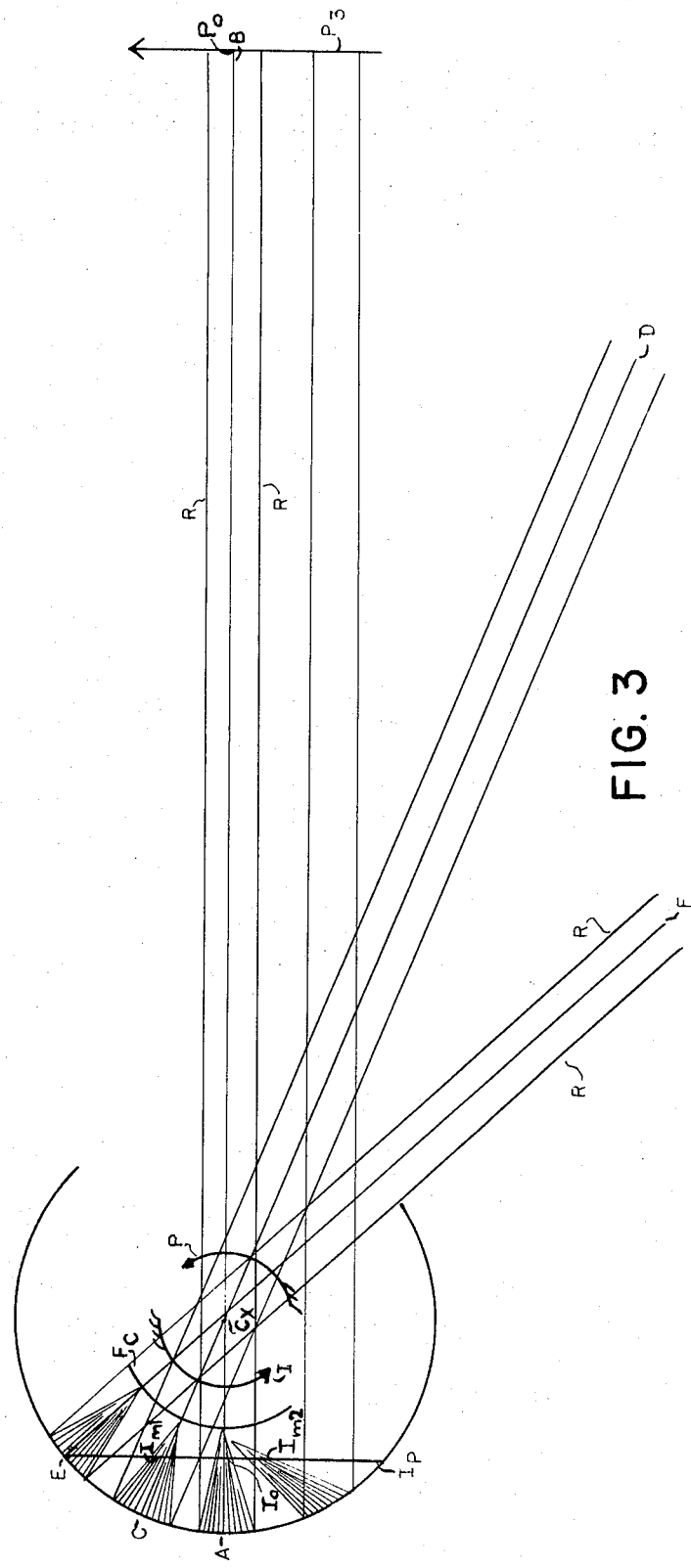

FIGS. 1 to 3 inclusive, are graphic illustrations to demonstrate some of the functions that are performed by the lens means. FIG. 1 represents a particular phase of its operation. It is concerned with only the light of parallel rays coming from an object that is in the field of view, when the object is in one of serveral selected positions along a path of travel. Only the rays from the extremities of the object P, boundary rays, are illustrated. Between the boundary rays an infinite number of parallel rays which are parallel with the boundary rays.

Thus, let it be assumed tha the object P is positioned astraddle an axis A–B, which is termed the principal axis of the lens $e_1$–$e_2$ since it passes through the concentric axis $c$ of the lens curvature and intersects the lens surface midway between the extremities $e_1$, $e_2$. The subscripts applied to the letter P denoting the object identify its position in the path of travel $x$–$y$. The similar subscript associated with the letter I identifies the image position with the object position.

When the object P is in position $P_0$, astraddle the principal axis A–B, the rays R from the extremities of the object parallel to the principal axis A–B are incident upon the reflecting surface $e_1$–$e_2$, at points at equal angles from the point of intersection of the principal axis A–B with the reflecting surface. The reflected rays from the points of incidence will intersect the principal axis A–B at a point just short of the principal focal point F of the lens. The focal point of the reflected rays for this position will be on the principal axis and the image $I_0$ will be formed on the image plane $I_p$. This image $I_0$ will be a band extending parallel to the concentric axis $c$ of the lens $e_1$–$e_2$, or in a direction at right angles to the plane of the drawing.

When the object P is in positions $P_2$ or $P_3$ to one side or the other of the principal axis A–B, the boundary rays R will have incidence with the reflecting surface on the one side of the principal axis A–B and at different distances from the principal axis A–B. As a consequence, the boundary rays R from the object P in positions $P_2$ or $P_3$ will intersect each other before the rays intersect the principal axis A–B, or will focus at a point short of the principal axis A–B and will focus at a point further removed in the direction of the reflecting surface from the principal focal point F. On the image plane $I_p$ the image $I_2$ and $I_3$ will each be smaller and more intense than the image closer to the principal axis A–B. When the object P is in either of the positions $P_1$, $P_4$ some of the boundary rays are incident on the reflecting surface $e_1$–$e_2$ at points greater than 45° from the principal axis A–B and when this happens the rays are not reflected towards the image plane $I_p$ and cannot form an image thereon. As a consequence, those rays beyond the 45° point do not help to form an image and only a partial image is formed.

It can be seen from FIG. 1, that images are formed on the image plane such as $I_0$, $I_2$ and $I_3$ for positions of object $P_0$, $P_2$ and $P_3$ respectively. The image plane $I_p$ is made parallel to the path of travel $x$–$y$ and in movement of the object from $P_3$ to $P_2$ through the position $P_0$ the image thereof moves from $I_3$ to $I_2$, which is parallel to the object and in the same direction. This is all FIG. 1 is intended to show.

As is well known, from every point on the object P rays of light emanate in an infinite number of directions, which are not parallel to the principal axis A–B or parallel to each other or to the boundary rays. For a more complete picture of what transpires, reference is made to FIG. 2, which is drawn to take into considerationn some of the non-parallel rays.

In FIG. 2, the object P is assumed to be situated in a position astraddle the principle axis A–B. The image $I_0$ is formed by the parallel rays R as it was in FIG. 1. When rays from the extremities of the object $P_0$ are drawn to points on the reflecting surface $e_1$–$e_2$ at equal angles from the principal axis A–B, the reflected rays from the points of incidence will intersect each other and the principal axis A–B at a point short of the principal focal point F. As the point of incidence of the incident rays move away from the principal axis A–B, the points of intersection of the reflected rays will move along the A–B axis farther away from the focal point F.

In FIG. 2, the cross hatched portions between the reflected rays do not represent image forming rays as they do in FIG. 1. Instead, the cross hatched portions were made merely to emphasize the direction of the different reflected rays. Rays which are incident on the reflecting surface at angles closer to the principal axis A–B will of course also focus on the principal axis A–B and at a point closer to the principal focal point F than do the parallel rays.

From FIG. 2 it is obvious that parallel rays alone will adequately disclose what transpires and that the non-parallel rays may be disregarded, since all rays at various angles come to a focus on the A–B axis and in fact some are sharper in focus than the parallel rays.

FIG. 3 represents a situation wherein only the parallel rays are considered and wherein the parallel rays are either parallel to the principal axis A–B or to one of the secondary axes. In FIG. 3, the reflecting surface is extended from the 180° shown in FIGS. 1 and 2 to 270°, leaving a 90° aperture. Three axes are illustrated, though it should be kept in mind that there are an infinite number of axes, which will be observed are no more than the extention of the radii to the mid point of the object. Only three such axes are shown, such as A–B, C–D and E–F. The object is assumed to straddle the axes in every instance. The parallel rays come to a focus on the axes at a point that falls within a cylindrical surface, represented by $F_c$, concentric with the reflecting surface of the lens, which has a radius slightly greater than one half the radius of the reflecting surface. The image plane $I_p$ is duplicated in FIG. 3 as in FIGS. 1 and 2.

It should be observed that the image follows axes which pivots about the concentric axis of the lens and if these axes are extended to the path $x$–$y$, it would be seen that the image and object move in parallel paths but in opposite directions to each other. Thus when the object P is in position $P_3$ an image $I_3$ results. As object P moves from $P_3$ to $P_0$, the image moves with the secondary axis to coincidence with the axis A–B to form image image $I_0$. At about the same time that the secondary axis approaches coincidence with the axis A–B, the object P reaches the position $P_3$. In this position $P_3$ the second image $I_3$ is formed on the image plane $I_p$ by the rays parallel to the principal axis A–B. This image moves towards the principal axis A–B from the opposite side of the principal axis from that of the first image and it pivots about a movable focal point that moves toward and into coincidence with the first image at the principal axis A–B. Thus there are two images coincident at the principal axis or superimposed one on the other to produce an image having double the brilliance of either of the separate images, causing what is herein termed a "glint."

The secondary axis C–D approaches within about five degrees of the principal axis A–B before the second image is formed by the parallel rays. The first image moves through about ten degrees while the second image is formed, moves into and out of coincidence with first image and disappears from the image plane $I_p$. From this it would be expected that there would be a repetition of the glinting for every ten degrees of motion of the secondary axis about the axis $C_x$, provided there is an image plane to receive the image and provided that the aperture angle is large enough for the rays to enter and reach the reflecting surface. The image plane could be made cylindrical and concentric with the reflecting surface and thus extend the range through which the image will be formed thereon. Or, an alternative would be to provide a plurality of photosensitive means arranged at progressively lesser angles with respect to the principal axis A–B to improve the capture area of the photosensitive means. In the preferred embodiment of the invention two cells are used and oriented at equal angles with respect to the axis A–B and at approximately 90° with respect to each other. With this arrangement, about six or seven glints were observed to occur for each traversal of the object across the field of view.

Figure 10:
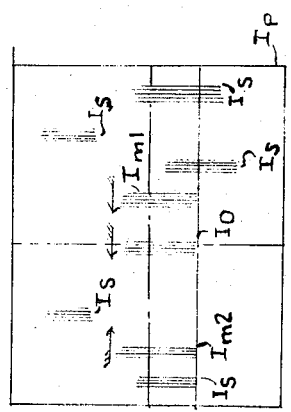
FIG. 10 is an enlarged plan view of an image plane presented to disclose the nature of the images formed thereon by the cylindrical lens means.

In consideration of the lens means thus far, it has been assumed that the object P was a light emitting object against a field of view of more or less uniform light emitting intensity different from that of the object. However, the field of view has other objects therein which are stationary objects from which images are formed on the image plane $I_p$. These images are displaced from each other in the image plane as for example as shown in FIG. 10. The stationary images are indicated by $I_s$ and they may be windows, doors, or pieces of furniture. As seen in FIG. 10 these images are also narrow bands in the image plane $I_p$ other than likenesses of the objects. In other words, these objects form bands of different intensities light in the image plane and determine the quiescent light level of the image plane. In FIG. 10 the movable images are indicated by $I_{m1}$, $I_0$ and $I_{m2}$. There are at least two images movable in opposite directions to or from each other and which traverse the stationary images in the image plane $I_p$. As the intruder or movable object enters the field of view and traverse the field of view he or it will intercept the light rays from the stationary images, entering into and moving out of coincidence therewith. Thus the image of the intruder or movable object will either partially or wholly screen off the stationary object and in so doing will modulate the total light on the image plane. The two images moving in opposite directions will do this which will add to the modulation of the light impinging upon the image plane $I_p$ From the disclosure of FIG. 1 – 3 inclusive, it is obvious that a single concave cylindrical reflective type lens oriented with its concentric axis vertical or at right angles to the path of motion of the object whose motion is to be detected will produce a light modulation. When a photosensive means is placed with its sensitive surface in an image plane that will intersect the greater number of rays, a signal having multiple pulses will be produced as the result of the light modulation. The multiple pulse type signal is produced without the need to resort to the provision of a retina with a multiplicity of cells or a mutiplicity of lens means oriented to cause the image to scan the photosensitive means a number of times in repetition for each traversal of the field of view by the object. This makes it unnecessary to provide a multiplicity of photosensitive means in a form of a retina and a plurality of separate lenses and thus simplifies the structure considerably. Further this simplification is accomplished with the result that a stronger output signal is obtained from the photosensitive means making it unnecessary to provide as much amplification, which reduces the noise generation within the apparatus.

Figure 7:
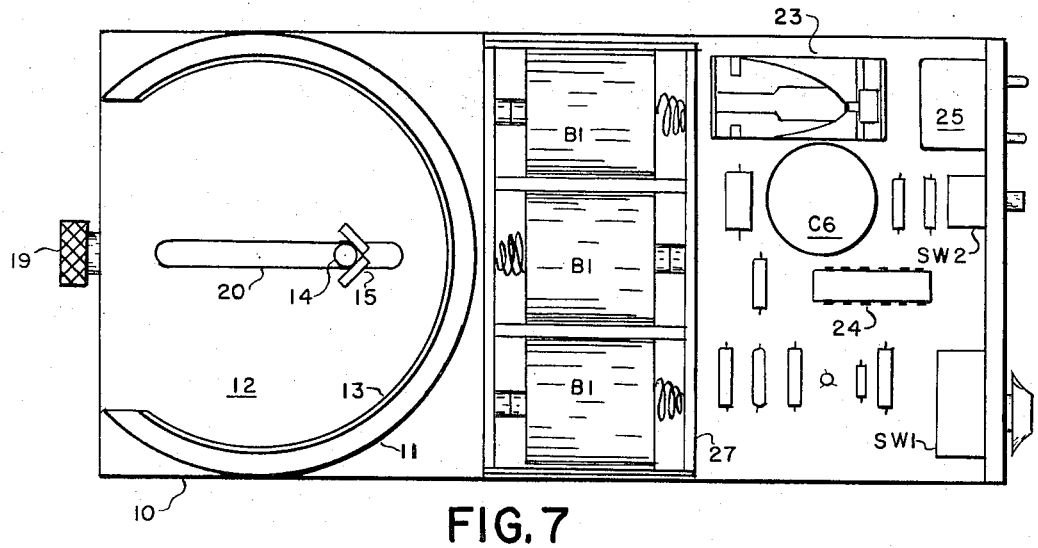
FIG. 7 is a plan view of the preferred embodiment of the invention showing the apparatus with the casing removed to disclose the arrangement of the components.
Figures 8, 9:
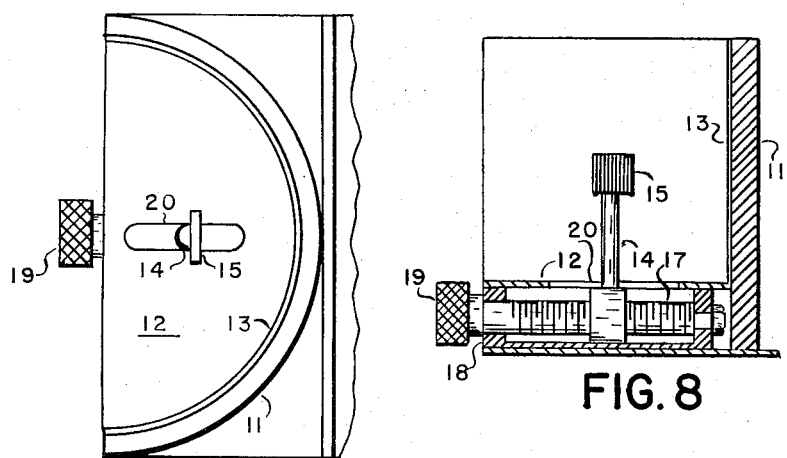
FIG. 8 is a fragmentary view of the apparatus of FIG. 7 disclosing the means for selectively adjusting the position of the photosensitive means along the principal axis of the lens to change the effective range of the apparatus.
FIG. 9 is a fragmentary plan view of the second embodiment of the invention showing the modifications of FIG. 7 as required for the second embodiment.

For a disclosure of the preferred embodiment of the invention reference is made to FIGS. 7 and 8, wherein a base 10 supports the various parts of the apparatus. The casing is left off so that the arrangement can be viewed. In FIG. 7, the left end portion represents the sensory part of the apparatus. It includes a cylindrical shaped form 11 upon which is installed a reflecting surface 13, such as a sheet of mylar. The reflecting surface 13 is cylindrical and extends through an angle of two hundred and seventy degrees, leaving a ninety degree aperture through which the light rays enter to impinge on the reflecting surface.

In this embodiment, a pair of photosensitive means 15 are mounted at approximately 90° with respect to each other on a post 14, that is selectively movable along the slot 20 in the floor 12 of the sensing chamber. The post 14 is attached to or made a part of a traveling nut which is in screw threaded engagement with the screw threaded shaft 17. The shaft 17 is rotatably journaled in a U-shaped member 18 mounted upon the base 10 immediately under the slot 20. The outer end of the shaft 17 carries a knurled knob whereby the post and photosensitive means may be adjusted relative to the reflective surface, to suit the requirements dictated by the environment in which the apparatus is to be used.

Behind the sensory chamber is a compartment for housing and supporting three battery cells $B_1$ which supply the power for the operation of the apparatus. To the right of the batteries is where the components of the electronic circuitry are installed. Only a few of the components are disclosed, such as a relay 23, a means 25 for externally connecting the relay contacts to an external alarm, a storage capacitor $C_6$, a switch $SW_2$ for shutting off the alarm means, an integrated solid state circuit chip 24, and a power switch $SW_1$. The integrated circuit chip encompasses much of the circuitry shown in FIG. 4 and thus the components encompassed thereby do not appear in the structure as separate components.

Figure 4:
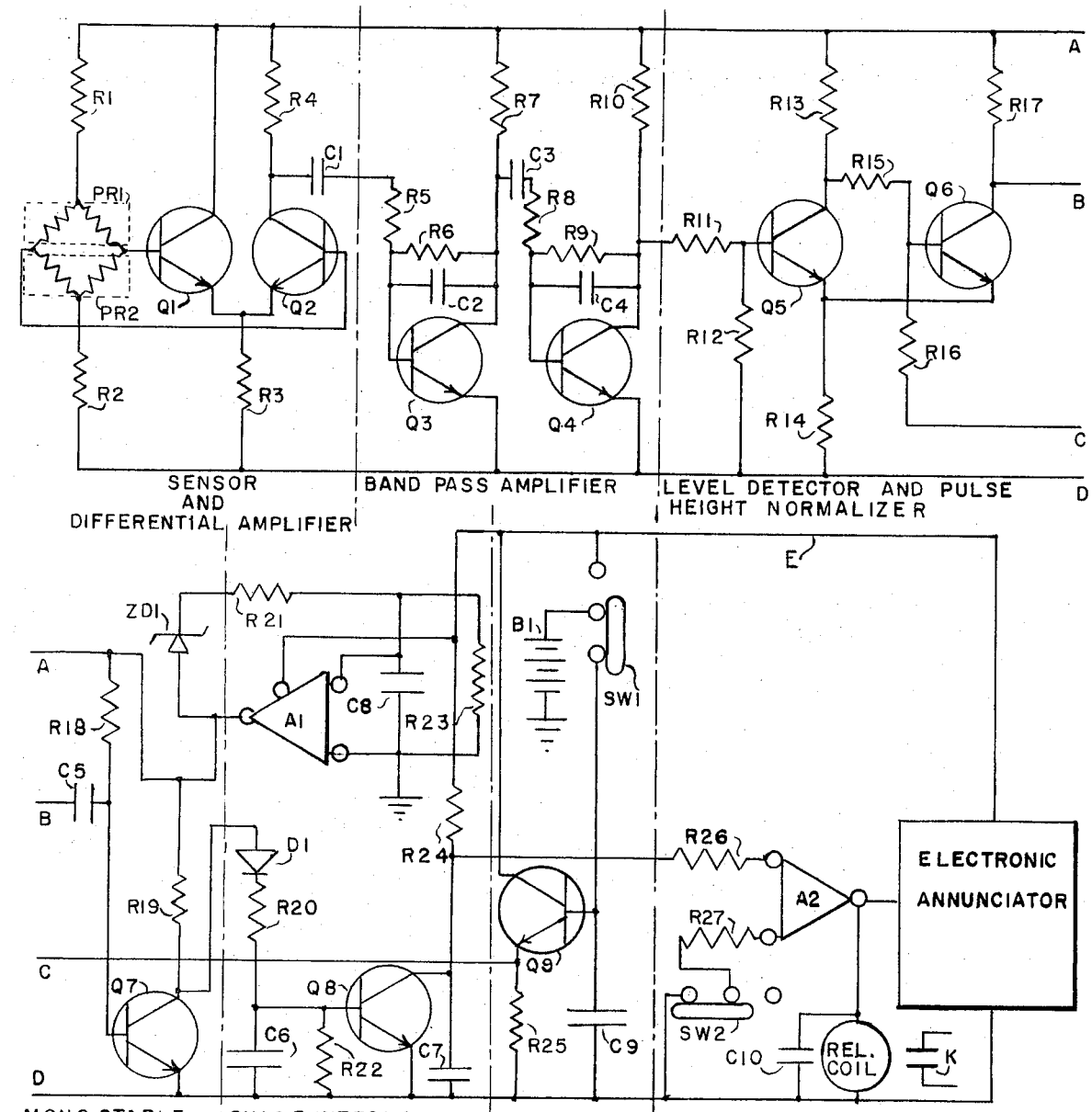
FIG. 4 is a schematic view of the electronic circuitry and the components used for the processing of the signal.

The photosensitive means includes two cells connected in a bridge configuration as shown in FIG. 4. As such and as connected it serves as a single photosensitive means for producing a signal having a multiplicity of pulses for each traversal of the field of view by an object or a person.

The bridge comprises of cells $PR_1$ and $PR_2$, which is of the photoresistive type. In other words, the resistance of the cells decrease with increase in light impinging thereon. The bridge is connected in series with current limiting resistors $R_1$ and $R_2$, so that when the cells reach low resistance they will not short circuit the supply voltage. The bridge is connected to the base terminals of transistors $Q_1$ and $Q_2$, which form a differential amplifier having their emitters connected together through a resistor $R_3$ to the grounded buss D. The collector of transistor $Q_1$ is connected directly to the buss A and the transistor $Q_2$ has its collector connected throgh resistor $R_4$ to the buss A. The impedance at the input of the differential amplifier is quite high and matches the average impedance of the bridge circuitry. The differential amplifier give good common mode rejection, thus helping to eliminate the voltage variations at the bases which are in phase with each other, as an example, those due to light modulations from fluoescent and neon lamps and the like. Only the unbalanced or out-of-phase voltages are effective to produce an output signal at the output of the differential amplifier.

The differential amplifier is coupled via capacitor $C_1$ and resistor $R_5$ to the base of transistor $Q_3$, the first of the two band-pass amplifiers. The resistor $R_6$ serves to bias the transistor $Q_3$ and the capacitor $C_2$ determines the upper frequency which will be fed back to the base of the transistor $Q_3$ and thus limits the amplification to the lower frequency signals. Transistor $Q_3$ has its collector connected to the buss A through load resistor $R_7$ and its emitter connected directly to the grounded buss D.

The collector of the transistor $Q_3$ is coupled through capacitor $C_3$ and resistor $R_8$ to the base of transistor $Q_4$, forming the second stage of the band-pass amplifier. The collector of transistor $Q_4$ is connected through biasing resistor $R_9$ to the base of transistor $Q_4$ to bias the transistor and by the capacitor $C_4$, which serves to limit the upper frequency that will be fed back to the base of transistor $Q_4$. The emitter of transistor $Q_4$ is directly connected to the grounded buss D. The collector of transistor $Q_4$ is connected through load resistor $R_{10}$ to buss A and through resistor $R_{11}$ to the base of transistor $Q_5$ which forms a part of a Schmitt trigger circuit. The base of transistor $Q_5$ is also connected via resistor $R_{12}$ to the grounded buss D. The resistors $R_{10}$, $R_{11}$ and $R_{12}$ form a voltage divider to bias the base of transistor $Q_5$ to predetermine the level of threshold for the transistor. Transistor $Q_5$ has its collector connected through loading resistor $R_{13}$ to the buss A and through resistor $R_{15}$ to the base of transistor $Q_6$, which forms the other part of the Schmitt trigger circuit. The emitters of transistors $Q_5$ and $Q_6$ are connected through resistor $R_{14}$ to the grounded buss D.

The Schmitt trigger circuit thus operates as a level detector and as a pulse height normalizer. In other words, the input pulses to the base of transistor $Q_5$ must exceed the bias voltage thereon to cause the Schmitt trigger to respond and change its state. Once the input voltage exceeds the threshold voltage of the transistor $Q_5$, it begins to conduct causing transistor $Q_6$, which has been conductive to become non-conductive. This causes the voltage on the collector of the transistor $Q_6$ to rise immediately to that of the buss A and thus to a fixed height or amplitude. This lasts for the period determined by the duration of conductivity of the transistor $Q_5$. When transistor $Q_5$ turns off the transistor $Q_6$ is turned on and the cycle is ended until another pulse is received at the base of transistor $Q_5$ which exceeds the threshold voltage thereon. Thus, at the collector of transistor $Q_6$ there will be a pulse of uniform amplitude produced for each input pulse at the base of the transistor $Q_5$ that exceeds its threshold. The pulse width at the collector of transistor $Q_6$ will be variable depending on the duration of the input pulse at the base of the transistor $Q_5$.

The output of the Schmitt trigger circuit is from the collector of the transistor $Q_6$ which is coupled through coupling capacitor $C_5$ to the base of transistor $Q_7$, having a connection to buss A through resistor $R_{18}$. The collector of transistor $Q_7$ is connected to the buss A through resistor $R_{19}$ and the emitter is connected directly to the buss D.

Transistor $Q_7$ has its collector connected through a diode $D_1$ and a resistor $R_{20}$ to a storage or memory capacitor $C_6$ which in turn is shunted by a resistor $R_{22}$.

The transistor $Q_7$ operates as a monostable multivibrator and pulse width normalizer. It is normally conductive while transistor $Q_6$ is conductive, at which time the voltage on its collector is substantially that of the grounded buss D. The capacitor $C_5$ will be charged to a voltage equal to the difference in the voltage drops across the resistors $R_{17}$ and $R_{18}$. When the transistor $Q_6$ becomes non-conductive, due to an input pulse on the base of the transistor $Q_5$, the capacitor $C_5$ finds the voltage on its terminals to be reversed from that which created the charge thereon. As a consequence, the capacitor takes current through resistor $R_{18}$, increasing its voltage drop for the period that is required to reverse the charge on the capacitor $C_5$. Thus, instantly with transistor $Q_6$ becoming non-conductive, the transistor $Q_7$ becomes non-conductive and remains so until the voltage drop across the resistor $R_{18}$ is reduced by the capacitor $C_5$ becoming reverse charged. This is a fixed period determined by the R-C constant of the circuit including the resistors $R_{17}$, $R_{18}$ and capacitor $C_5$. When the transistor $Q_7$ becomes non-conductive for the fixed period. A positive voltage pulse appears at its collector. This voltage pulse is connected through diode $D_1$ resistor $R_{20}$ to the storage or memory capacitor $C_6$ to charge it to a voltage depending on the number of pulses received per unit of time and the bleed rate of resistor $R_{22}$.

The memory capacitor $C_6$ is connected across the base-emitter circuit of the transistor $Q_8$, which has its collector connected through resistor $R_{24}$ to the buss E, which, when switch $SW_1$ is in its upper or "on" position is supplied with energy direct from the positive terminal of the battery $B_1$. The collector-emitter circuit of transistor $Q_8$ is connected across capacitor $C_7$.

The voltage on the collector of transistor $Q_8$ in its quiescent state is at the same voltage as that which is on the buss E. The collector is connected directly through resistor $R_{26}$ to one terminal on the amplifier $A_2$ to thus establish a high voltage on the one terminal. Another terminal of the amplifier $A_2$ is connected through resistor $R_{27}$ and switch $SW_2$ to the grounded buss D. So long as a high voltage exists on the one terminal of the amplifier $A_2$ and a low voltage exists on the other terminal there will be no voltage at the output terminal of the amplifier $A_2$. With no voltage at the output of the amplifier $A_2$ there will be no energy supplied to the relay coil or the electronic annunciator and no alarm or annunciation will be produced.

Whenever the voltage on the memory capacitor $C_6$ exceeds the threshold voltage of transistor $Q_8$, it conducts, discharging capacitor $C_7$ and reducing the voltage on its collector and causing a reduction of voltage on the one terminal of amplifier $A_2$. This initiates the operation of amplifier $A_2$ and the energization of the relay and the annunciator. The alarm will continue to operate so long as the voltage on the memory capacitor $C_6$ remains above the threshold of the transistor $Q_8$ and for a period thereafter required for the capacitor $C_7$ to again become charged to again raise the voltage on the one terminal of the amplifier $A_2$. When this occurs, the alarm is discontinued and the relay contacts open. The capacitor $C_{10}$ across the relay coil serves to absorb the voltsurge when amplifier $A_2$ ceases the supply voltage to the relay and annunciator.

Figure 5:
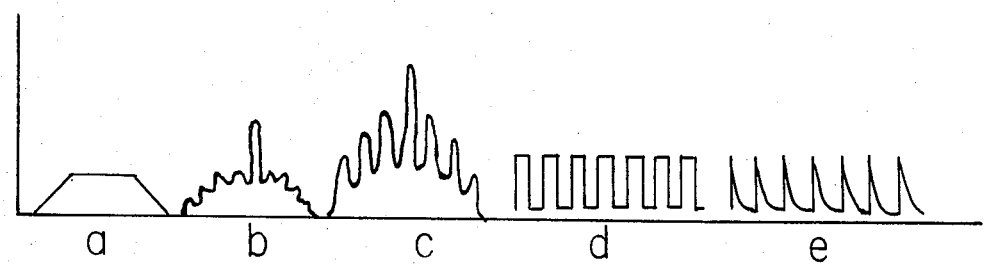
FIG. 5 is a graph of the characteristics of the signals at different points in the processing operation.

For a review of the operation of the apparatus, reference is now made to FIGS. 5 and FIG. 10. The pulses produced at the output of the bridge $PR_1$, $PR_2$ is applied to the differential amplifier. When the object moves across a field of view having a background light intensity different from that of the object, the output of the amplifier would be a signal similar to that shown in FIG. 5a, that is, having an increasing ramp, a constant portion and a decreasing ramp. However, the fields of view are never of this character, but instead, comprise a variable background with many stationary objects. When an object enters the field of view and tranverses it the light intercepts the light emanating from the back-ground and the multiplicity of objects and causes a modulation of the light on the photosensitive means in addition to the signal of the character shown in FIG. 5a. The signal thus produced would be similar to that shown in FIG. 5b, wherein there would be a large number of pulses or varying amplitudes produced at the output of the differential amplifier. It was observed that there was in addition to the comparatively low amplitude pulses, a pulse of comparatively higher amplitude occuring at about the intant that the object passed through the midtravel position across the field of view. There was nothing in the field of view that could account for this high amplitude pulse. It was attributed to two movable images moving into coincidence with each other.

In FIG. 10 the stationary objects in the use of the cylindrical mirror like lens have band-like images which are indicated by $I_s$ They are dispersed at random in the image plane. The movable images, two in number resulting from a single object moving in the field of view, are indicated by the $I_{m1}$ and $I_{m2}$, the image $I_{m1}$ being the slower moving of the two images and the image $I_{m2}$ being the faster moving of the two images. The two images $I_{m1}$ and $I_{m2}$ move toward each other in FIG. 10 and coincide with each other at the position $I_o$ which in FIG. 3, is on the principal axis A–B. The coincidence of the images produce the high amplitude pulse. These high amplitude pulses occur approximately every ten degrees of movement of the image $I_{m1}$.

The output of the differential amplifier is fed into the band-pass amplifiers, that is to the base of transistor $Q_3$, wherein, only the lower frequency pulses are amplified. The signal appearing at the output of the band-pass amplifier would appear similar to that shown in FIG. 5c, wherein, there are a fewer number of pulses of greater amplitude. The output from the band-pass amplifier is fed to the base of the transistor $Q_5$ which has a threshold limiting its response to only those pulses that have a predetermined amplitude level. The Schmitt trigger produces a plurality of pulses having a uniform amplitude but a variable duration or length. The output of the Schmitt trigger is fed to the circuit containing the resistor $R_{17}$, $R_{18}$ and capacitor $C_5$. In this circuit the square topped pulses are converted to spiked pulses as seen in FIG. 5e which appear at the base of the transistor $Q_7$ to controll the conductivity of the transistor $Q_7$. The wave form at the collector of the transistor $Q_7$ is similar to that shown in FIG. 5 d except that the pulses are also of uniform duration and length. These pulses are fed to the memory capacitor $C_6$ and the rate at which they are fed thereto determines the voltage across the capacitor $C_6$ and when and if the alarmed is triggered.

FIGS. 5 and 10 only represent characteristics of the signal at the various points in the electronic circuitry and the shape of the images as would appear on the photosensitive means for one field of view. Other fields of view would of course produce different characteristics in the signal and different dispersal of the images in the image plane. Also, different valued components in the feedback circuits and in the biasing circuits would change the response of the apparatus from one that responds only to the high amplituide pulses to one that responds to different frequencies and different amplitude. The invention is not limited to the response to only the high amplitude pulses caused by the glinting effect, but may be made responsive to the pulses produced not only by the glinting effect but also to the modulation caused by the coincidence of the movable and stationary images.

The apparatus is equipped with an arming means for delaying the operation of a predetermined time interval after the switch $SW_1$ connects the battery $B_1$ to the buss E. When switch $SW_1$ is "off" as to buss E, a capacitor $C_9$ is connected across the battery $B_1$ and becomes charged. Connected in parallel with the switch $SW_1$ and capacitor $C_9$ between busses E and D is a circuit including the collector-emitter circuit of transistor $Q_9$ and resistor $R_{25}$. When switch $SW_1$ is in the "off" position, the collector of transistor $Q_9$ has no voltage thereon. Base-emitter circuit of transistor $Q_9$ is connected in series with resistor $R_{25}$ across the capacitor $C_9$. Thus, the base-emitter current will be kept to a low value. It will be seen that the resistors $R_{13}$, $R_{15}$, $R_{16}$ and $R_{25}$ form a voltage divider network that biases the base of transistor $Q_6$.

When switch $SW_1$ is moved to the "on" position, connecting buss E to the battery $B_1$, transistor $Q_9$ becomes conductive, because the capacitor $C_9$ furnishes the bias on its base while the charge lasts causing an increase voltage drop across the resistor $R_{25}$. This is applied to the base of transistor $Q_6$ and prevents the functioning of the Schmitt trigger circuit while this voltage drop exists. The voltage drop exists until the capacitor $C_9$ becomoes discharged, at which time, the apparatus becomes armed and ready to respond to pulses from the sensory means.

The apparatus further includes a voltage regulating circuit for connecting the busses E and A, whereby the buss A which supplies a lower voltage to the sensory means, the amplifiers, level detector and normalizing circuits will be regulated. The regulator circuit include amplifier $A_1$, a dualamplifier of the type uA749 made by Fairchild, appearing publication Fairchild Semiconductor dated November 1971 on page 136, which has one terminal connected to the buss E and an output terminal connected to the buss A, which operates at a lower voltage than that supplied to the buss E. The output of amplifier $A_1$ is connected back through a Zener diode $ZD_1$ and resistor $R_{21}$ to one terminal of the Amplifier $A_1$. This terminal is also connected through a parallel circuit consisting of capacitor $C_8$ and resistor $R_{23}$ to the other input terminal of the amplifier $A_1$. The feed back circuit including the Zerner Diode controls the voltage at the output of the amplifier $A_1$ and thus controls the voltage on the buss A and maintains it at a constant predetermined value for the life of the battery $B_1$. Without the voltage regulator the apparatus would have faulty operation as the battery neared the end of its life.

The preferred embodiment of the invention thus disclosed has two photosensitive means and provides for a wide viewing angle and long range viewing. This is the result of the sensitive surface being extended over a greater portion of the image plane than is possible with a single photosensitive means. In areas of utilization where wide angle viewing and greater range is not needed or desired, a single photosensitive means and a shorter reflecting surfaces is more desirable. FIG. 9 discloses another embodiment of the invention having only a single photosensitive means. The structure is the same as disclosed in FIG. 7 except that the reflecting surface extends over one hundred and eighty degrees instead of over two hundred and seventy degrees. Only one photosensitive means is used and it is oriented at right angles to the principal axis A-B of the lens curvature.

Figure 6:
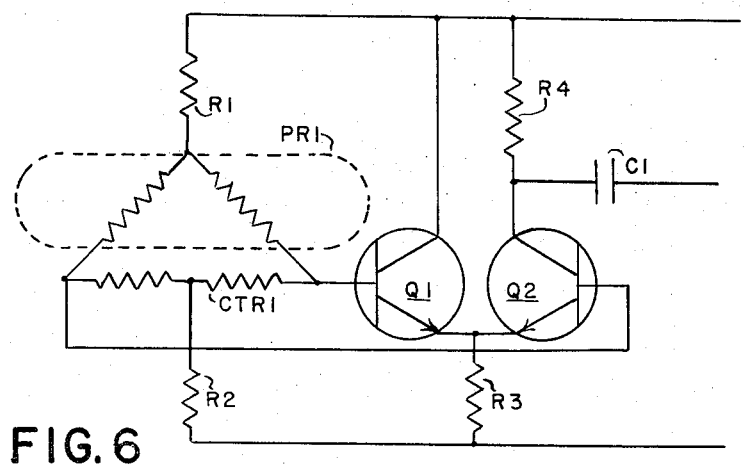
FIG. 6 is a fragmentary portion of the electronic circuitry showing a modification thereof required in the second embodiment of the invention.

The electronic circuitry, shown in FIG. 6 has a center tapped resistor $CTR_1$ substituted for the photosensitive means $PR_2$ occupying the same position in FIG. 4. The structure and arrangement and mode of operation is otherwise the same as is disclosed for the preferred embodiment of the invention. Both embodiments of the invention include the means for selectively adjusting the position of the photosensitive means along the axis A-B FIG. 8 discloses the structure of such means for both embodiments.

The invention as disclosed in the two embodiments perform the same general functions as the prior art apparatus performs, that is, it produces a signal when there is movement occuring within a given area under surveilence. However, the present apparatus has fewer components in the sensory means, and produces a stronger signal than is possible from the prior art devices. Also, the present apparatus by its inherent nature is more reliable than the prior art apparatus, because of its response only to those signals which can only be produced by motion within the area under surveilence.

As herein previously disclosed, the cylindrical type lens means oriented in a direction with its concentric axis vertical produces elongated images of every thing in the field of view. These images as seen in FIG. 10 are some stationary and some movable. Also there are at least a duality of images produced for each object in the field of view. The movable images move in opposite direction and at different speeds with respect to each other and coincide at a given point in their travel producing a glint effect, or an image of substantially the double intensity. This glint effect is found to occur about every ten degrees of motion of the object that is responsibile for their production. The duality of movable images also move into and out of coincidence with the stationary images and this produces a modulation of the light upon the sensitive surface of the photosensitive means, but of a lower amplitude than that produced by the glinting effect.

The combination of the two modulating operations, namely that produced by the coincidence of the movable images with the stationary images and those produced by the coincidence of the movable images with each other produce a higher amplitude output pulse from the photosensitive means than could be produced by the prior art apparatus.

The discovery of what the cylindrical lens means will do has enabled the production of a more sensitive and more reliable piece of apparatus of greater simplicity and at less cost.

Having disclosed my invention and its mode of operation, what I consider to be my invention is set forth in the following claims;

I claim:

1. An intrusion detecting apparatus responsive to motion in a predetermined area comprising:
   a cylindrical concave reflecting type lens means directed towards said predetermined area for producing a duality of band-shaped images of each stationary object within said area and a duality of images of each movable object in said area, which images are movable at different speeds and in opposite directions with respect to each other and into and out of coincidence with each other and the images of said stationary objects as the movable objects traverse said area;
   photosensitive means for receiving said images of objects in said area and responsive to the changing conditions caused by the images moving into and out of coincidence with each other and with said stationary images to produce a signal voltage having a series of voltage pulses;
   means for amplifying said voltage pulses and generating a series of pulses of uniform amplitude and duration in response to said amplified voltage pulses;
   means for storing said uniform voltage pulses and for generating a voltage whose level represents the frequency of said uniform pulses; and
   means responsive to a predetermined level of voltage in said means for storing said uniform pulses for sounding an alarm.

2. The apparatus as set forth in claim 1, wherein;
   said photosensitive means comprises a plurality of cells arranged approximately in a focal surface of said lens means extending the sensitive surface of said photosensitive means in a direction in which the movable images will move, whereby to increase the number of coincidences of the movable images that will be sensed, and
   means responsive to the amplitude of said voltage pulses to elimiinate low amplitude pulses and to restrict the response of said apparatus to voltage pulses having amplitudes comparable to those produced as a result of coincidence of said movable images.

3. The apparatus as set forth in claim 1 wherein;
   said cylindrical concave reflective type lens has a reflecting surface extending through two hundred and seventy degrees and
   wherein said photosensitive means comprises two cells arranged at an angle to each other and in a side by side relation along the path of motion of said images.

4. The apparatus as set forth in claim 1 wherein said cylindrical concave reflecting type lens has a reflecting surface extending over one hundred and eighty degrees and
wherein said photosensitive means comprises of a single cell oriented at right angles to and astraddle the principal axis of said lens means.

5. Apparatus as set forth in claim 1 further including means for selectively adjusting the position of said photosensitive means along the principal axis of said lens, whereby said apparatus may be adjusted to suit conditions produced by the environment in which the apparatus will find utilization.

* * * * *